July 5, 1955 G. W. FINDLEY 2,712,431
TRACTOR JACK
Filed Jan. 30, 1952 2 Sheets-Sheet 1
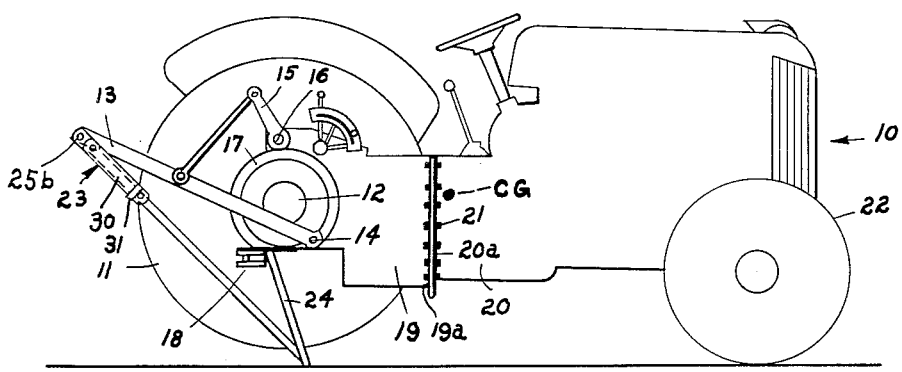
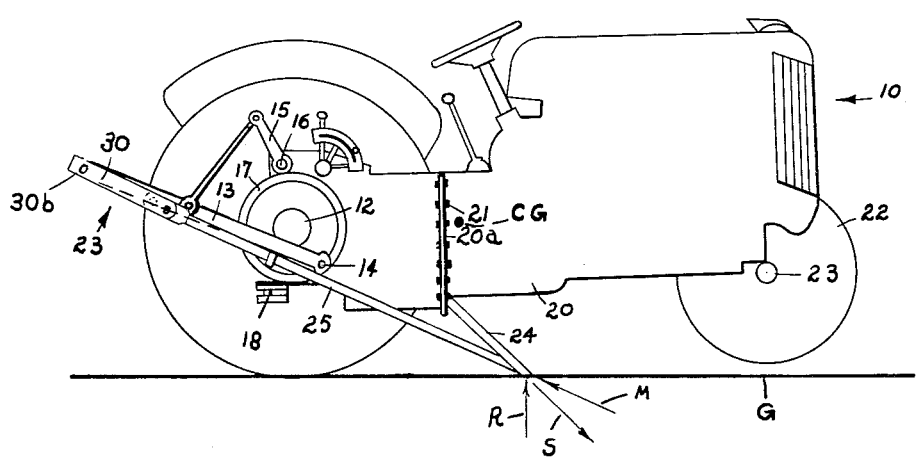
INVENTOR.
GEORGE W. FINDLEY
BY
ATTORNEYS July 5, 1955   G. W. FINDLEY   2,712,431
TRACTOR JACK
Filed Jan. 30, 1952   2 Sheets-Sheet 2
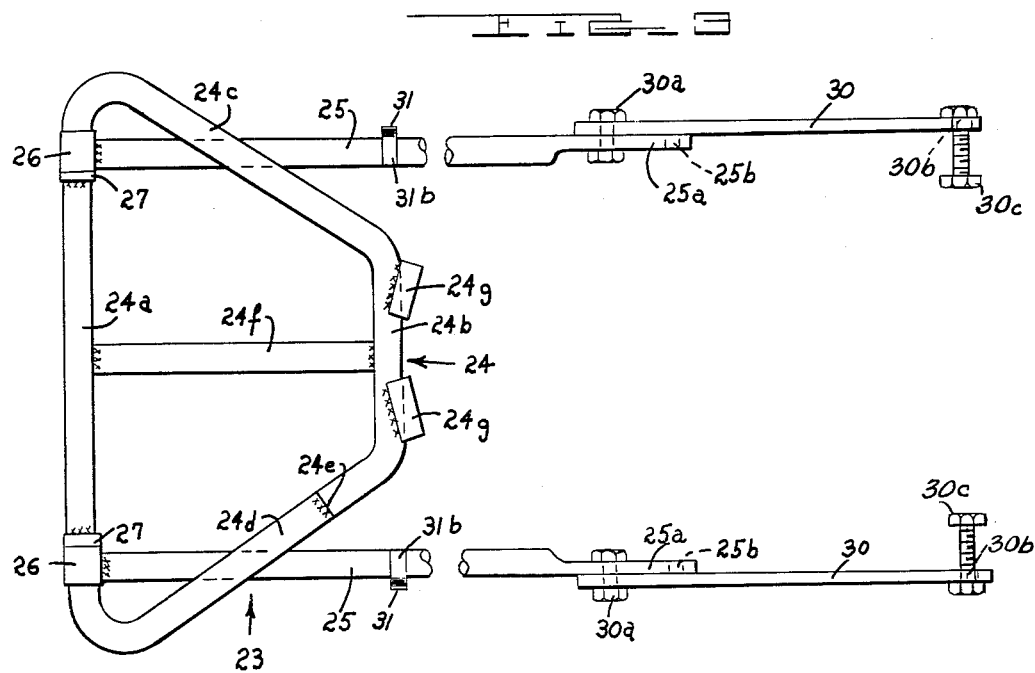
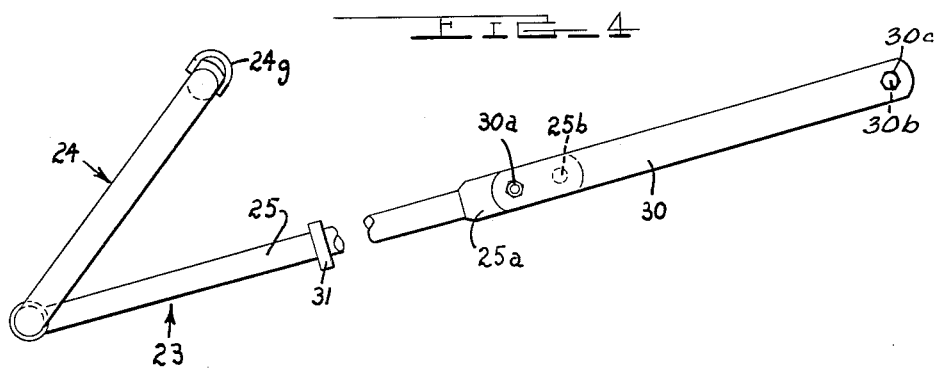
INVENTOR.
GEORGE W. FINDLEY
BY
AND
ATTORNEYS

United States Patent Office 2,712,431
Patented July 5, 1955

2,712,431

TRACTOR JACK

George W. Findley, Birmingham, Mich., assignor, by mesne assignments, to Ford Motor Company, Dearborn, Mich., a corporation of Delaware Application January 30, 1952, Serial No. 268,997

3 Claims. (Cl. 254—86)

This invention relates to a tractor jack and more particularly to a jack for use with a tractor having a power lifted hitch linkage.

While there are available a wide variety of jacks for lifting a vehicle to permit changing of tires and for other reasons, most of such jacks are not suitable for use with tractors. Such jacks as may be adapted for raising of the tractor are generally too cumbersome and expensive to interest the tractor owner. Among other things, the commonly available jacks for tractors are hand operated thereby taxing the operator's patience as well as consuming valuable time in operating the jack.

A well-known make of tractor in common use today has a built-in hydraulically operated ram for power lifting a pair of hitch links which are connected at laterally spaced points to thetractor rear axle housing. These hitch links are conveniently utilized for transporting various implements mounted thereon and raising and lowering such implement from and to a working position.

It is, therefore, an object of this invention to provide an improved jack for a tractor having a pair of power lifted hitch links which conveniently utilizes such links for actuating the jack to raise the tractor.

Another object of this invention is to provide an improved jack for a tractor having a pair of power lifted hitch links wherein the jack is selectively positionable under the tractor to respectively permit raising the rear or front wheels of the tractor.

Still another object of this invention is to provide an improved and simplified jack for use with a tractor having a pair of power lifted hitch links which is economical to manufacture and extremely easy to use.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a side elevational view of a tractor showing the improved jack constructed in accordance with this invention positioned for elevating the rear end of the tractor;

Figure 2 is a view similar to Figure 1 but showing the jack positioned for elevating the front end of the tractor;

Figure 3 is an enlarged plan view of the tractor jack; and

Figure 4 is a side elevational view of Figure 3 but showing the stand partially elevated.

As shown on the drawings:

In Figures 1 and 2, there is shown a tractor 10 of well-known make. Tractor 10 has a pair of rear wheels 11, one of which, however, is removed for clarity of illustration and such wheels are respectively rotatably mounted on the ends of an ear axle housing 12. A pair of laterally spaced hitch links 13 are connected at laterally spaced points 14 to tractor axle housing 12. A pair of rock arms 15 are respectively secured to the ends of a transverse rock shaft 16 journaled in the upper portion of the differential housing 17 of tractor 10. Rock shaft 16 is rotated by a built-in hydraulic mechanism (not shown). Underneath the tractor differential housing 17, there is provided a pair of vertically spaced plates which define a clevis hitch 18 and which conveniently permits attachment of implement or vehicle tongues to the tractor. The differential housing terminates in a center housing 19 which is of a unitary cast construction with a forwardly facing end flange 19a which is connected to the rearwardly facing flange 20a of the tractor transmission housing 20 by a plurality of bolts 21. The center of gravity CG of the tractor is located stlightly forwardly of the joined flanges 19a and 20a and is disposed approximately on the horizontal center line of the tractor rear axle housing 12. The front end of tractor 10 is supported by a pair of wheels 22 journaled on the ends of a front axle 23. All of the above described elements of the tractor 10 are well-known and hence further description thereof is not believed necessary.

The improved tractor jack 23 constructed in accordance with this invention, as best shown in Figures 3 and 4, comprises a stand 24 and a pair of force transmitting members 25. Stand 24 is of tubular construction and comprises a single tube bent into a generally trapezoidal form which has a base 24a substantially longer than its top portion 24b and connecting sloping sides 24c and 24d. The ends of the stand 24 are welded together as shown at 24e, thus forming a continuous loop. A vertical tubular strut 24f has its ends respectively welded to the center of base portion 24a and the upper portion 24b. The top portion 24b has a pair of laterally spaced pads 24g welded thereto in generally V-shaped relationship to cradle portions of the tractor therein. The over-all height of stand 24 is substantially greater than the ground clearance of the bottom of the tractor.

The force transmitting members 25 may conveniently comprise a pair of tubes having their one end 25a deformed into a rectangular bar-shaped portion as best shown in Figure 4. Obviously, the force transmitting members 25 may be of solid bar stock or a flexible member such as a chain or cable. The extreme forward ends of bar portions 25a are apertured as shown at 25b for a purpose to be presently explained. A pair of extension links 30 are respectively pivotally connected to the bar-like end portions 25a. A pair of bolts 30a respectively inserted through suitable aligned apertures in links 30 and bar portions 25a effect such connection. It will be noted that bolts 30a are disposed somewhat rearwardly of apertures 25b so as not to obstruct such apertures when the links 30 are folded forwardly as will be explained. The free ends of links 30 are respectively apertured as shown at 30b.

The other ends of the tubular force transmitting members 25 are respectively welded to a pair of sleeves 26 surrounding the bottom portion 24a of stand 24. The sleeves 26 and hence the lower ends of the force transmitting member 25 are maintained in laterally spaced relationship by a pair of collars 27 respectively welded about the bottom tubular portion 24a of stand 24 and spaced equidistantly from the centrally disposed vertical strut 24f. A pair of suitably formed spring clips 31 yieldingly secure the hinged links 30 in a folded position alongside the force transmitting member 25 as will be described. The clips 31 each have a resilient hook portion 31b which permits such clips to be respectively attached to members 25 at a desired location to receive links 30.

Operation

To use the tractor jack 23 with tractor 10 having the power lifted hitch links 13 for elevation of the rear wheels of such tractor, the stand portion 24 is placed under the tractor in a vertically inclined position with the pads 24g on the upper portion 24b contacting the underside of the differential housing 17 and in abutment with the forward end of the tractor clevis 18. The force transmitting members 25 project rearwardly and the hitch links 13 are then lowered to their lowermost position whereupon connection of bars 25 to hitch links 13 is effected by respectively aligning the holes 25b of bars 25 with the apertured ends of the hitch links 13 and inserting bolts 30c through such aligned holes. The links 30 are folded forwardly alongside of bars 25 and are received by clips 31 when so positioned. Upon raising the hitch links 13, the lower or bottom end portion 24a of stand 24 is then pulled rearwardly which reduces the vertical inclination of stand 24 and hence will elevate the rear end of tractor 10 to approximately the position shown in Figure 1 at which point the hitch links 13 are elevated to their maximum height. It will be noted that the tractor rear wheel 11 amply clears the ground to permit it to be conveniently removed from the tractor.

When the tractor stand 24 with links 30 extended is disposed under the tractor as shown in Figure 2 with its upper end portion 24b placed underneath the tractor transmission housing 20 and pads 24g in abutment with flange 20a and the underside of the tractor, the holes 30b of links 30 may then be conveniently respectively aligned with the apertures provided in the trailing ends of hitch links 13 when such links are in a lowered position. The bolts 30c may then be inserted through such aligned holes to pivotally connect the trailing ends of the links 30 to such hitch links. Again upon raising of the hitch links 13, the lower end 24a of stand 24 is moved rearwardly to reduce the vertical inclination of the stand 24. Inasmuch as the center of gravity CG of tractor 10 is located rearwardly of the contact point of the stand 24 with the ground, the front end of tractor 10 will be elevated as the hitch links 13 are raised. This is more readily understood if reference is made to Figure 2 wherein the lines of force of the force transmitting member 25 and stand 24 are respectively represented by the arrows M and S. The member 25 is in tension and the stand 24 is in compression; hence the resultant force represented by the arrow R is vertical and rises from the intersection of members 25 and stand 24. Therefore the resultant force R in effect acts on the tractor directly above the point of contact of stand 24 with the ground. More generally stated the front end of the tractor will be lifted when the stand 24 contacts the ground ahead of the center of gravity of the tractor and the rear end will be lifted when such contact point is in back of the center of gravity. Thus the front wheels may be conveniently removed to effect repair of tires or changing thereof or for other purposes.

From the foregoing description it is clearly apparent that there is here provided an improved tractor jack of simplified construction which is conveniently actuated by the power lifted hitch linkage of a tractor of well-known make. By selective positioning of the stand portion of this improved jack relative to the tractor structure, either the front end or the rear end of the tractor can be readily elevated for changing of wheels, etc.

It will, of course, be understood that many details of construction may be varied through a wide range without departing from the principles of this invention and it is, therefore, not the purpose to limit the patent granted hereon otherwise than necessitated by the scope of the appended claims.

I claim:

1. For use with a tractor having a power lifted hitch link, a tractor jack comprising a stand, an extensible arm having one end pivotally connected to said stand, and means on the other end of said arm for selectively pivotally securing said arm to the hitch link in either its extended or retracted condition for respectively selectively positioning said stand in engagement with the underside of the tractor adjacent the tractor center of gravity or substantially rearwardly thereof, whereby raising of the hitch link respectively raises the tractor front or rear end.

2. For use with a tractor having a power lifted trailing hitch link and at least two longitudinally spaced projections on its underside located respectively adjacent and substantially behind the tractor center of gravity, a tractor jack comprising a stand having a ground engaging portion rigidly connected to a spaced tractor contacting portion, said tractor contacting portion being selectively engageable in abutting relationship with either of said tractor projections, said tractor contacting portion being spaced from said ground engaging portion by a distance greater than the height of the tractor projections above the ground, and means for operatively connecting said ground engaging portion to the tractor hitch link, whereby the tractor rear wheels are elevated by raising of said hitch link when said stand is engaged with the rearmost tractor projection and its ground engaging portion lies rearwardly of the tractor center of gravity and the tractor front wheels are elevated by raising of said hitch link when said stand is engaged with the foremost tractor projection and the ground engaging portion of said stand lies forwardly of the tractor center of gravity.

3. For use with a tractor having a power lifted trailing hitch link and at least two longitudinally spaced projections on its underside located respectively adjacent and substantially behind the tractor center of gravity, a tractor jack comprising a stand having a ground engaging portion rigidly connected to a spaced tractor contacting portion, said tractor contacting portion being selectively engageable in abutting relationship with either of said tractor projections, said tractor contacting portion being spaced from said ground engaging portion by a distance greater than the height of the tractor projections above the ground, and a bar pivotally connected to said ground engaging portion and extending rearwardly and upwardly for connection to the free end of said hitch link, said bar having longitudinally spaced means on its rear end adapted for selective connection to said hitch link at either position of said stand relative to said tractor projections and the ground engaging portion of said stand lies ahead of or in back of the tractor center of gravity, whereby the front or rear wheels of the tractor may be selectively elevated by raising movements of said hitch link.

References Cited in the file of this patent

UNITED STATES PATENTS 2,555,471    Chambers _____ June 5, 1951

FOREIGN PATENTS 616,641    Great Britain _____ Jan. 25, 1942